Patented Nov. 26, 1929

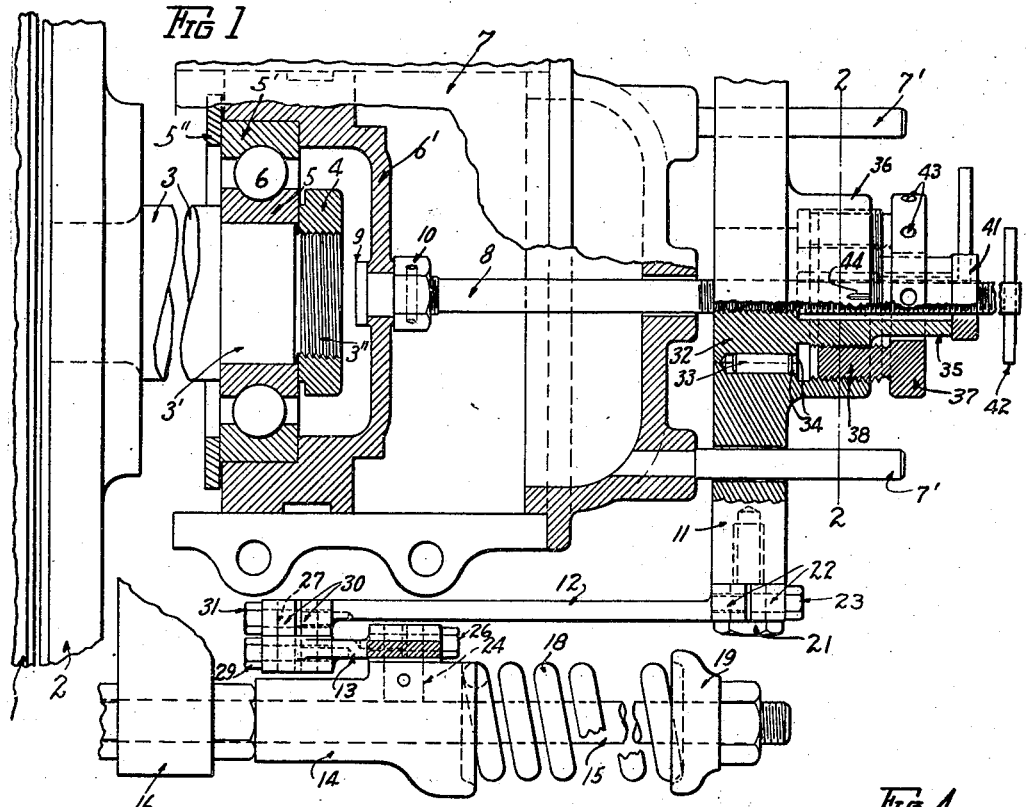

1,737,183

UNITED STATES PATENT OFFICE

EDWARD M. BRENNAN AND ALLAN P. DANIEL, OF SPRINGFIELD, OHIO, ASSIGNORS TO THE BAUER BROTHERS COMPANY, OF SPRINGFIELD, OHIO, A CORPORATION OF OHIO

ATTRITION MILL

Application filed March 8, 1928. Serial No. 260,137.

This invention relates to attrition mills which employ relatively rotatable disintegrating disks, it more particularly relating to means for adjusting the space between the disks.

The object of the invention is to provide means for adjusting one of the disks of a nature which will permit a more accurate and finer adjustment to be had in a simple and effective way.

The invention consists in the provision of an auxiliary adjusting device in the nature of a nut having two sets of threads of different pitch, one set having a threaded engagement with a fixed member and the other set a threaded engagement with a movable member connected with the adjustable disk.

In the accompanying drawings:

Fig. 1 is a view partly in top plan and partly in transverse section of so much of an attrition mill as is necessary to illustrate the improvements.

Fig. 2 is a section on the line 2—2 of Fig. 1.

Fig. 3 is a view partly in side elevation and partly in longitudinal section of the micrometer adjusting nut.

Fig. 4 is an end view of the same.

Fig. 5 is a side elevation of the toggle joints shown in Fig. 1.

Referring to the drawings, 1 and 2 represent opposed disintegrating disks, one or both of which are rotated from any suitable source of power (not shown). In the present case the disk 2 is the one which is adjusted to secure the proper space between the disks and this disk 2 is secured to a shaft 3 which has a reduced portion 3' upon which is locked by a nut 4 one of the races 5 of ball bearings 6; the nut being screwed upon a threaded extension 3" of the shaft. The other race 5' of the ball bearings is retained in the shouldered portion of a hollow cage 6' by the retaining ring 5". The cage 6' is slidably mounted in the bearing housing 7 and has rotatably connected therewith a partially threaded rod 8, termed the temper screw, the inner end of this screw 8 projecting loosely through an aperture in the end of the cage 6' and having a head 9 and a nut 10 threaded thereon to rotatably connect it with the end of the cage. The screw 8 passes loosely through an aperture in the outer end of the housing 7 and the outer end thereof is threaded as shown. A cross-bar 11 is slidably mounted upon guide pins 7' projecting from the housing 7 and each end of this cross-bar has pivotally connected therewith one end of a lever arm 12, which has pivotally connected with the other end thereof an arm 13. The arm 13 is pivotally connected to a sleeve 14 slidably mounted upon a rod 15 secured to a bracket 16 which projects from the housing 7". A coil spring 18 is interposed between the sleeve 14 and a collar 19 fastened on the outer end of the rod 15. The outer end of the cross-bar is connected to a similar pair of arms (not shown). This cross-bar and the devices described form an abutment to hold the disk 2 to its work but permit it to yield slightly if necessary to accommodate any foreign substances passing between the disks. The pivoted connection between the arms 12 and 13, when the disks are at work, occupies a position slightly below the pivotal connection between the arm 13 and the sleeve 14 and provision is made for swinging the inner ends of these arms upwardly to separate the disks and to also furnish a quick release from the spring tension under certain conditions, this means consisting of a yoke, each of the arms 20 of which are connected with an arm 13 so that by pulling the yoke outwardly both arms 13 are swung upwardly about their pivotal connections with the sleeve 14 so as to push the arms 12, cross-bar and connected part outwardly. This arrangement is one which is well known in attrition mills, although in the present case the levers 12 and 13 have been so connected with each other and with the cross bar 11 and sleeve 14 that lost motion is eliminated. To that end the lever 12 is pivotally connected to a stud 21 which is screwed into the end of the cross bar 11, the end of the lever being provided with a split portion indicated at 22 which is clamped to the stud by a screw 23 tight enough to eliminate lost motion but at the same time permit the lever 12 to pivot about the stud 21. The lever 13 is fastened to a stud 24 which is pressed into the sleeve 14; that is, it has a split portion 25 which is clamped to the stud by the screw 26 tight enough to eliminate lost motion but permit the lever to pivot about the stud. The two levers 12 and 13 are pivotally connected together by a pin 27. The lever 13 is provided with a split portion 28 clamped to the pin by the screw 29 and the lever 12 is provided with a split portion 30 clamped to the pin by the screw 31. These screws act to clamp the split portions of the respective levers to the pin tight enough to eliminate lost motion but permit the lever to pivot about the pins. Each of the pins and studs is formed with an annular groove to receive the screws to lock the parts against axial displacement. The groove in the stud 21 is indicated at dotted line 21' in Fig. 5 and one of the grooves in the pin 27 is indicated at 27' in Fig. 5.

To carry out the present invention, there is threaded upon the screw 8 to a position within the cross-bar what is termed a follower plug indicated at 32. This block is of cylindrical form and fits loosely in a bore or aperture in the cross-bar but is locked against rotary movement by a key in the form of a pin 33 which is fitted in registering grooves or key-ways 34 in the cross-bar and plug as shown in Fig. 1. The plug has an extension 35, the inner portion of which has external threads. The cross-bar is provided with a cylindrical hollow boss or extension 36 which is provided with internal threads. An adjusting nut 37 has a laterally projecting annular flange 38 which is provided with external threads 39 corresponding to the internal threads of the boss 36 and with internal threads 40 corresponding with the external threads of the extension 35. These threads are all right-hand threads but the threads 39 are of a different pitch from the threads 40 and the threads of the extension 35 and boss 36 of a corresponding character. In the present machine the external threads 39 and corresponding internal threads of the boss 36 run ten to the inch, while the internal threads 40 and corresponding external threads of the extension 36 run eleven to the inch. A lock nut 41 is threaded upon the screw 8 to impinge against the end of the extension 35 to lock the screw in adjusted position.

In assembling, the follower plug 32, which has a threaded aperture, is screwed upon the screw 8 into the bore of the cross-bar 11 and the pin 33 inserted to hold the plug against rotation. The adjusting nut 37 is then screwed on the extension 35 and into the boss 36 a suitable distance.

To secure the initial adjustment to the disks, the screw 8 is turned by the handle 42 until the disk 2 is approximately in the desired relation to the disk 1 and the nut 41 then tightened. To further and more accurately adjust the disks to the proper working position the nut 37 is then turned to move the plug 32 axially, which, by reason of its threaded connection with the screw 8, moves the rod, bearing block 6, shaft 3 and disk 2. When the parts are threaded as described, one-ninth of a revolution of the nut 37 results in the movement of approximately one-thousandth of an inch of the disk 2, although it will be obvious that the extent of movement imparted to the disk by a given partial rotation of the nut may be varied by the change in the respective pitches of the threads. The nut 37 is preferably provided with a series of holes 43 in which a rod or pin may be inserted to facilitate turning of the nut. In the present case nine of these openings are provided, and the boss 36 has an indicating mark 44 so that by observing the registration of the openings 43 with this mark an accurate adjustment of one-thousandth of an inch or any multiple thereof may be had.

Having thus described the invention, it is claimed:

1. An element capable of axial movement, an axially-movable non-rotatable member connected therewith, a normally immovable member, said members having threads of different pitch, and a rotatable member interposed between the non-rotatable and normally immovable members and provided with internal and external threads for engaging the threads of the non-rotatable and normally immovable members.

2. An element capable of axial movement, an axially-movable non-rotatable member connected therewith having external threads, a normally immovable member having internal threads, the threads of one member being of a different pitch from those of the other, and a third rotatable member having a part provided with external and internal threads for engagement with the threads of the other two members.

3. In an attrition mill, a rotatable disk capable of axial movement, a normally immovable member, a plug movable axially in said member but held from rotation with relation thereto, a part extending from said disk having a connection with said plug, said immovable member and plug having threads of different pitch, and a rotatable member having a threaded engagement with said threads.

4. In an attrition mill, a rotatable disk capable of axial movement, a bar normally held against movement, a plug slidably mounted in said bar but held from rotation with relation thereto, a threaded rod connected with said disk having a threaded engagement with said plug, said plug and bar having threads of different pitch, and a rotatable nut having a part provided with threads for engagement with the threads of said plug and bar.

5. In an attrition mill, an axially movable disk, a bar normally held against movement, a plug axially movable in said bar but held from rotation, a screw connected with said disk and having a threaded engagement with said plug, said plug having a portion provided with external threads, said cross-bar having a portion provided with internal threads surrounding the threads of said plug, said threads being of different pitch, and a rotatable nut provided with a flange having external and internal threads for engagement with the threads of said plug and bar.

6. In an attrition mill, an axially movable disk, a bar normally held against movement, a plug axially movable in said bar but held from rotation, a screw connected with said disk and having a threaded engagement with said plug, said plug having a portion provided with external threads, said bar having a portion provided with internal threads surrounding the threads of said plug, said threads being of different pitch, and a rotatable nut provided with a flange having external and internal threads for engagement with the threads of said plug and bar, said screw being capable of rotation relatively to said disk.

7. A rotatable disk capable of axial movement, a normally immovable member, a plug movable axially in said member but held from rotation with relation thereto, a part extending from said disk having a threaded connection with said plug together with means for rotating said part to furnish a quick axial adjustment for said disk, said immovable member and plug having threads of different pitch, and a rotatable member having a threaded engagement with said threads.

8. In an attrition mill, a rotatable disk capable of axial movement, a rotatable stem having screw-threads connected with said disk, a non-rotatable but axially movable member in which said stem is threaded, a normally fixed part for supporting said non-rotatable member, said non-rotatable member and fixed part having threads of different pitch, and a rotatable member having a threaded engagement with said threads.

9. In an attrition mill, a rotatable disk capable of axial movement, means for adjusting said disk axially at a predetermined speed, and additional means for also adjusting said disk axially at a lesser speed than the first adjustment, said second adjustment means including a manually operated member and speed reducing devices between said member and disk, and means additional to said two adjusting means for quickly withdrawing said disk from operative position.

In testimony whereof, we have hereunto set our hands this 6th day of March, 1928.

EDWARD M. BRENNAN.
ALLAN P. DANIEL.